United States Patent [19]

Raleigh

[11] 4,175,159

[45] Nov. 20, 1979

[54] SILICONE EMULSIONS FOR TREATING SILICATE PARTICULATE MATTER

[75] Inventor: William J. Raleigh, Rensselaer, N.Y.

[73] Assignee: General Electric Company, Waterford, N.Y.

[21] Appl. No.: 929,461

[22] Filed: Jul. 31, 1978

[51] Int. Cl.$^2$ .................... B32B 17/00; C08A 31/09
[52] U.S. Cl. .................... 428/405; 106/287.12; 106/287.13; 106/287.15; 260/29.2 M; 427/221; 427/372 R; 427/387; 428/404; 428/447
[58] Field of Search .................... 428/404, 405, 447; 260/29.2 M; 106/291, 308 M, 287.12, 287.15, 287.13; 252/312, 321; 427/221, 387, 372 R

[56] References Cited

U.S. PATENT DOCUMENTS

| | | | |
|---|---|---|---|
| 3,362,933 | 1/1968 | Culpepper | 428/405 |
| 3,418,151 | 12/1968 | Otrhalek | 428/404 |
| 3,861,939 | 1/1975 | Merrill | 428/447 |
| 3,963,627 | 6/1976 | Cottrell | 428/405 |
| 4,046,941 | 9/1977 | Saito | 428/404 |

FOREIGN PATENT DOCUMENTS

| | | | |
|---|---|---|---|
| 680839 | 2/1964 | Canada | 260/29.2 M |
| 1920467 | 11/1969 | Fed. Rep. of Germany | 260/29.2 M |

*Primary Examiner*—Ellis P. Robinson
*Attorney, Agent, or Firm*—E. Philip Koltos; John L. Young; Philip L. Schlamp

[57] ABSTRACT

A silicone emulsion for treating silicate particulate matter such as perlite and vermiculite, to make it water-resistant comprising a silicone fluid composed of difunctional siloxy units, trifunctional siloxy units and monofunctional siloxy units and as the emulsifier in water there is the reaction product of an aliphatic carboxylic acid with ammonia. The silicone emulsion is applied by spraying it on to the heated silicate particulate matter which is preferably heated to at least 150° C., such that the silicone fluid rapidly cures on the particulate matter.

21 Claims, No Drawings

SILICONE EMULSIONS FOR TREATING SILICATE PARTICULATE MATTER

BACKGROUND OF THE INVENTION

The present invention relates to silicone emulsions and more particularly the present invention relates to silicone emulsions for rendering silicate particulate matter such as perlite and vermiculite water-resistant. Perlite and vermiculite are naturally occurring siliceous rock. Perlite is a volcanic glassy ash rock while vermiculite is mica.

The distinguishing feature which sets perlite and vermiculite apart from other mineral glasses is when they are heated to a suitable point in their softening range, these rocks expand to 4 to 20 times their original volume. This expansion is due to the presence of two to six percent by weight of combined water in the crude perlite or vermiculite rock. When such ground crude perlite or vermiculite rock is heated to a temperature above 1600° F. or 871° C., the crude rock rapidly expands in a manner similar to popcorn as the combined water vaporizes and creates countless tiny bubbles in the heat softened glassy particles. It is these tiny glass-sealed bubbles which account for the very light weight and other exceptional physical properties of expanded perlite or vermiculite.

Expanded perlite and vermiculite can be manufactured to weigh as little as two pounds per cubic foot or 32 kilograms per cubic meter making such expanded perlite and vermiculite adaptable for numerous industrial uses. Accordingly, such material as perlite and vermiculite and specifically the expanded perlite has countless uses as additives in the formulation of abrasives, acoustical plaster, acoustical tile, charcoal barbecue base, concrete aggregate, filteraid, fertilizer extender, foundry ladle covers, foundry sand additive, inert carrier, insulation board, loose fill insulation, packaging material, paint texture, pipe insulation, plaster aggregate, plaster texture, potting soil additives, soil conditioner, tile mortar aggregate and wallboard core filler.

In the loose fill application for instance, it may be inserted into hollow masonry cavities such as that in concrete blocks or between brick walls and other masonry walls as insulation. It has been found it can also be incorporated in the formulation of insulation boards and other types of wall materials for insulative properties. It has been found that when perlite has been used as loose fill insulation in masonry walls, it has retarded the passage of heat or of cold through the wall by 50%.

Accordingly, perlite and vermiculite as an insulation have found wide acceptance in the building industry. However, there is one difficulty with perlite and vermiculite as insulation. Due to the large surface area of the particulate matter after it has expanded it will absorb and hold a great deal of moisture. Thus, expanded perlite or expanded vermiculite when manufactured is completely dry, but when exposed to moisture it will pick up 50% of the exposed moisture and absorb it.

The perlite or vermiculate that has absorbed moisture also tends to keep the moisture in the perlite or vermiculite particle. Such perlite or vermiculite particulate matter when it has become saturated with moisture functions ineffectively and very poorly as a thermal insulation barrier. Accordingly, it was highly desirable to make expanded perlite or expanded vermiculite resistant to the adsorption of water vapor. There are a number of coatings that could be utilized to make vermiculite and perlite resistant to water vapor, however, silicones is one of the basic chemicals in industry that has resistance to weathering and specifically, water vapor. Silicone solutions for application to masonry walls so as to render them water repellent are well known. Accordingly, it was highly desirable to formulate a silicone coating solution or material for application to perlite or vermiculite so as to render it water resistant. Accordingly, various silicone compositions were formulated for this application. One such silicone composition for application to perlite to render it water repellent is an emulsion of a methyl hydrogen polysiloxane fluid.

It should be noted to maintain the cost of the treated perlite as inexpensive as possible, it was desirable to apply the silicone coating to the perlite in as inexpensive a manner as possible. Accordingly, one process which has been devised and which has been found highly suitable is to produce a solution of emulsion of the silicone and spray it on the heated perlite as it comes from the furnace.

Accordingly, the water in the water emulsion then is evaporated and the silicone is cured onto the perlite. This is a simple and inexpensive way of applying the silicone coating. Accordingly, it was highly desirable to formulate silicone coatings, which could be applied by a simple spray method onto the expanded perlite or expanded vermiculite. Accordingly, the water emulsions of methyl hydrogen polysiloxane fluid could be applied in such a manner. However, the trouble with such emulsions and specifically with methyl hydrogen polysiloxane fluids, is that they will slowly at times liberate hydrogen upon standing in the 55 gallon drums in which they are packaged. Accordingly, the drums have to be continually checked to see that the hydrogen gas is released to the atmosphere and does not accumulate in the drum and possibly result in a fire or explosion.

Another type of silicone composition which was found acceptable for coating expanded perlite or expanded vermiculite is an aqueous solution of sodium methyl siliconate. Sodium methyl siliconate is a water repellent compound which when applied to masonry will render it water repellent. The difficulty with such sodium methyl siliconate is that it is corrosive and, accordingly, has to be handled carefully by the workers applying the material and handling it.

Another type of silicone that could be utilized is an alkoxy functional silane such as methyltrimethoxy silane dissolved in water or as a dispersion in water. The difficulty with such alkoxy silanes is that unless they are dispersed to quite a low concentration in water they are highly flammable materials since the pure material has a flash point of 47° F. Accordingly, all the prior art silicone coatings for silicate particulate matter were found to be undesirable for one reason of another and basically because of flammability or handling problems. Accordingly, it was highly desirable to find a silicone material or a silicone coating composition which would coat the silicate particulate matter such as expanded perlite or expanded vermiculite and which was not flammable and which was not dangerous to handle by the workers applying the compositions in the field.

It was also desirable to prepare a silicone coating composition which could be applied with facility to the expanded perlite and vermiculite as the expanded perlite and vermiculite were manufactured in the factory or plant in which they were produced.

It should be noted that in the above description while in some sense specific to expanded perlite and expanded vermiculite applies to other particulate silicate matter. There are other types of particulate silicate matter which is desired to be made water-resistant by applying a silicone coating thereover. That the prior art silicone compositions which could be applied to such particulate silicate matter to make it water resistant have the disadvantages discussed previously. Accordingly, it was highly desirable to be able to formulate a suitable silicone coating for all types of silicate particulate matter including perlite and vermiculite. It is one object of the present invention to provide for a silicone coating for a silicate particulate matter which is inexpensive, and simple to apply. It is another object of the present invention to provide for a silicone coating composition for expanded perlite and vermiculite which is inexpensive and simple to apply.

It is an additional object of the present invention to provide for silicone coating compositions for perlite and vermiculite which coating compositions are not flammable.

It is yet an additional object of the present invention to provide for a simple and economic silicone coating emulsion composition for perlite and vermiculite which does not present a problem in handling by the workers applying the composition. These and other objects accomplished by means of the disclosure set forth hereinbelow.

SUMMARY OF THE INVENTION

In accordance with the above objects, there is provided by the present invention a silicone emulsion for treating silicate particulate matter to make the particulate matter water resistant comprising (a) from 40 to 60 parts by weight of a silicone fluid having $R_2SiO$ units R $SiO_{1.5}$ units and $R_3SiO_{0.5}$ units with the ratio of organo siloxy units to dioorganosiloxy units varies from 0.11 to 1.4, inclusive and the ratio of triorganosiloxy to diorgano siloxy units varies for 0.02 to about 1, inclusive and the fluid has a silanol content varying from 0.1 to 8% by weight and a viscosity varying from 10 to 10,000 centipoise at 25° C. and where R is a monovalent hydrocarbon radical; (b) from 0.5 to 5 parts by weight of a aliphatic carboxylic acid having from 6 to 20 carbon atoms; (c) from 0.01 to 0.8 parts by weight of ammonia; and (d) from 20 to 150 parts of water.

The method for preparing the coated silicate particulate matter, such as the coated perlite and vermiculite comprises (1) applying to the surface of silicate particulate matter a silicone emulsion having (a) from 40 to 50 parts by weight of a silicone fluid having $R_2 SiO$ units, R $SiO_{1.5}$ units where the foregoing ratio of the units is given previously and the fluid has a silanol content varuing from 0.1 to 8% by weight and a viscosity varying from 10 to 10,000 centipoise at 25° C.; (b) from 0.5 to 5 parts by weight of an aliphatic carboxylic acids of from 6 to 20 carbon atoms; (c) from 0.1 to 0.8 parts by weight of ammonia; and (d) from 20 to 150 parts of water; (2) curing the silicone emulsion and evaporating the water. The best way to cure the silicone emulsion and evaporate the water is to apply or spray the silicone emulsion onto the expanded perlite or vermiculite which has been heated to at least 15° C.

It should also be noted that in accordance with the present invention the foregoing emulsion and concentration of ingredients can be utilized as stated previously except that for the silicone fluid having the trifunctional siloxy units, the difunctional siloxy units and the monfunctional siloxy units there can be utilized a silanol endstopped diorganopolysiloxane polymer with the organo groups being monovalent hydrocarbon radicals and the viscosity of the polymer varies from 10 to 10,000 centipoise at 25° C. The radical R in the above formula is preferably methyl and the aliphatic carboxylic acid is oleic acid. It should be noted that the advantage of preparing the emulsion in which the emulsifying agent is an ammonia salt of an aliphatic carboxylic acid is that upon heating and curing of the silicone emulsion, the ammonia will evaporate into the atmosphere leaving behind the aliphatic carboxylic acid, which is an oil and which acts to resist moisture. If there was utilized for instance an alkali metal salt of an aliphatic carboxylic acid, then when the silicone fluid was cured, the metal salt would remain on the surface of the silicate particulate matter rendering the surface somewhat suceptible to the absorption of moisture and detracting away from the hydrophobic characteristics of the silicone coating. Accordingly, it is desired to utilize a fugitive emulsifying agent so that there will not be any chance of the emulsifying agent remaining on the silicone coating and rendering it suceptible to picking up moisture.

DESCRIPTION OF THE PREFERRED EMBODIMENT

In the silicone emulsion preferably there is utilized a silicone fluid having diorganodifunctional siloxy units, mono-organofunctional trifunctional siloxy units and triorgano monofunctional siloxy units rather than silanol endstopped diorganopolysiloxane polymer as the silicone fluid to provide the silicone coating on the silicate particulate matter since such a fluid is less expensive than the silanol endstopped diorganopolysiloxane polymer. The radical R in the formula of the units may be any monovalent hydrocarbon radical or halogenated monovalent hydrocarbon radical such as for instance alkyl radials of 1 to 8 carbon radicals such as ethyl, methyl, propyl, alkenyl radicals, such as vinyl, allyl; mononuclear aryl radicals such as phenyl, methylphenyl, ethylphenyl; halogenated monovalent hydrocarbon radicals such as fluoroalkyl radicals for instance 3, 3,3 trifluoropropyl. Most preferably the R radical is methyl since that is the cheapest silicone fluid that needs silanol groups in order to cure. The silicone fluid will cure by the silanol groups condensing to liberate water and form an SiOSi linkage.

Accordingly, it is generally preferred the silicone fluid trifunctionality have from 0.1% to 8% by hydroxy groups attached to the silicone atoms and more preferably anywhere from 0.1% to 2% by weight of hydroxy groups attached to the silicone. If the trifunctional silicone fluid disclosed above, has too much silanol in it, it will not cure fully unless a protracted heating step is utilized and if it has too little silanol groups in the trifunctional silicone fluid then the silicone fluid will not cure at all.

With respect to the ratio of the different units in the polymer, this may vary as indicated previously, in which the ratio of the organo siloxy units to diorgano siloxy units varies from about 0.11 to 1.4, inclusive and the ratio of the triorgano siloxy units to diorgano siloxy units varies from 0.02 to about 1, inclusive.

More preferably, the ratio of the organo siloxy units to the diorgano siloxy units has a value of anywhere from 0.11 to about 0.36, inclusive and the ratio of said triorganosiloxy units to diorgano siloxy units has a value which varies from 0.02 to about 0.04, inclusive. It has been found that the trifunctional silicone fluid with the units within the preferred range is the simplest to make and has the most preferred properties. However, the basic advantage of the preferred ratio of units of the diorgano siloxy units to triorgano siloxy units as to mono-organo siloxy units is that within the preferred range the fluid is simplest to produce. The branched or trifunctional silicone fluid of the instant case can be produced by hydrolyzing a mixture of diorganodihalosilanes, $R_2SiX_2$, organotrihalosilanes, $RSiX_3$, and triorganohalosilane, $R_3SiX$, where R is as previously defined and X is a halogen radial such as chloro. It has been found expedient to maintain a concentration of effluent acid formed during the hydrolysis of the above ingredients to below about 31% by weight of acid and preferably in the range of between about 28 to 32% of acid. If the hydrolysis is accomplished at a pH of 5 to about 7 by use of buffering agents such as alkali bicarbonates, the trifunctional silicone fluid can be made by having 8% or more by weight of hydroxy groups attached to silicone. Preferably the hydrolysis is performed at a temperature below 30° but a temperature between 20° to 40° C. will provide for effective results. The hydrolyzate is then recovered from the acid layer and neutralized with a standard neutralizing agent such as alkali bicarbonate for example sodium bicarbonate or ammonium. There are various ways in which the branch-chained trifunctional silicone fluid can be produced other than the above indicated. For instance instead of chlorosilanes that can be hydrolyzed, alkoxy-containing silanes to yield a trifunctional silicone fluid with possibly some alkoxy groups. Such alkoxy groups will not interfere with the cure of the branch-chained silicone fluid. Accordingly, the procedure for preparing such a fluid can be as follows: The triorganochlorosilane can be blended with the organotrichloro silane and analyzed for monofunctional to trifunctional unit ratio by Mass spectrometer. Then the difunctional silane can be added and the ratio of the trifunctional to difunctional ratio can be determined so that it is in accordance with the above description. The reason for this addition is that the relatively small amount of monofunctional siloxy cannot be accurately measured in the presence of the large amount of trifunctional siloxy units. The final blend of chlorosilanes must then be free from SiH hydrosilane since the presence of such silanes will cause the mixture to gel upon hydrolysis. It also important to note that the foregoing ratios of trifunctional chlorosilanes to difunctional chlorosilanes to monofunctional chlorosilanes must be observed if the mixture is not to gel upon hydrolysis and if the mixture is to have the desired properties in accordance with the disclosure hereinbelow.

Accordingly, preferably the silane blend can then be continuously hydrolyzed, keeping the hydrolyzate effluent, acid concentration at about 20% and the temperature of the hydrolysis under 30° C. The silicone hydrolyzate fluid can then be continuously decanted from the water acid phase. Then the silicone fluid which contains some acid can be neutralized with about 1% of a saturated salt solution or it can be treated with sodium bicarbonate to reduce the acidity. The salts that are formed can then be removed by filtration. Then the silicone fluid can be neutralized with 2% of dry Fuller's Earth by stirring it at about 90° C. After heating for two hours, the fluid is cooled and tested for acidity. Such a fluid as tested for acidity shouldn't contain more than 25 parts per million of acid in it. If it contains more than 25 parts per million of acid in it then the excess acid will cause the fluid to degenerate or revert.

Accordingly, should the branch-chained silicone fluid fail to pass the acidity test then it is reheated to 90° C. for another hour, and if it still fails to pass the test and another 1% Fuller's Earth is used and the process is continued as before. Finally, when the fluid passes the acidity test, it is filtered to remove all the salts and Fuller's Earth. It should be noted as stated previously that the silane blend must be practically free from methylhydrogendichlorosilane in order that the hydrolyzed product will pass the final product specification. Not more than 0.2% silicone hydride is allowable in the starting blend.

In addition, concentrations of acid above 29% in the hydrolyzate effluent is undesirable since it increases the possibility of gelling the silicone fluid in the hydrolyzate vessel and it may increase the volatiles in the product. Lower acid concentration than 28% in the hydrolyzate increases the tendency of the acid and oil to emulsify and so prevent efficient separation of oil and water by decantation. It should also be noted that temperatures for the hydrolyzate in excess of over 30° generally are undesirable although temperatures of up to about 50° can be tolerated. However, care has to be utilized in carrying out the hydrolysis at these high temperatures since temperatures above 30° C. for the hydrolysis may cause the silicone fluid to gel in the hydrolyzate mixture. On the other hand, temperatures below room temperatures will not deleteriously affect the hydrolysis and may be desirable. It should be noted that temperatures 0° C. and below may be utilized without any disadvantageous results. The only undesirable part of such a hydrolysis below room temperature is that it requires additional cooling equipment to carry out the reaction at that temperature.

It should also be noted that the shelf life of the acidic trifunctional silicone fluid is very short and excess acidity will cause the silicone fluid to gel. Accordingly, the acid specification is very pertinent in the production of the branch-chained silicone fluid.

It should be noted that this presence of water in the silicone fluid for the application of the instant case is not a detriment since a water emulsions is the form of the silicone fluid as discussed previously. It should be noted that in the instant composition there may be utilized a catalyst to cure the emulsion or the branch-chained silicone fluid. Such a catalyst would speed up the cure of the branch-chained silicone fluid. Examples of such catalysts are metal salts of carboxylic acid such as for instance iron salts of carboxylic acid, such as iron octoate, zinc octoate and other such salts. Such salts will increase the rate of cure of the branch-chained silicone fluid in the emulsions of the instant case at a much faster rate then would be the case without the catalyst. The only trouble with having such a metal salt of carboxylic acid present as a catalyst and even in a small concentration of 0.01 to 0.1% by weight of the silicone fluid is that the metal salt of carboxylic acid may cause back wetting which will be described with respect to the emulsifying agents that may be utilized with the silicone emulsions of the instant case. Such metal salt of carboxylic acids may take away the water resistance or repellancy of the silicone coating that is put on the silicate particulate matter.

Another material that may be utilized as a silicone fluid for producing a silicone fluid emulsion for being applied to silicate particulate matter, such as expanded perlite and expanded vermiculite is a silicone emulsion of a silanol endstopped diorganopolysiloxane polymer, where the polymer has the viscosity of anywhere from 10 to 10,000 centipoise at 25° C. and more preferably has a viscosity varying anywhere from 50 to 5,000 centipoise at 25° C.

It should be noted that with respect to the previous branch-chained silicone fluid that the foregoing viscosity limitations for the silanol end-stopped diorgano polysiloxane polymer applies to the branch-chained silicone fluid. Thus the silicone branch-chained fluid desirably has a viscosity that varies anywhere from 10 to 10,000 centipoise at 25° C. and more preferably varies from 50 to 5,000 centipoise at 25° C.

Such silanol terminated diorganopolysiloxane polymer is preferably basically linear with about a maximum of 0.1% by weight of combined monofunctionality and trifunctionality. The organo groups of such linear polymer may be selected from any monovalent hydrocarbon radical and halogenated monovalent hydrocarbon radical such as alkyl radicals from 1 to 8 carbon atoms, methyl, ethyl, propyl, etc.; cycloalkyl radicals such as cyclohexyl, cycloheptyl, cyclooctyl, etc.; mononuclear aryl radicals such as phenyl, methylphenyl, ethylphenyl; halogenated alkyl radicals such as 3, 3, 3 trifluoropropyl, etc. Most preferably the organo radical is an alkyl radical of 1 to 8 carbon atoms such as methyl. A preferred formula for these linear silanol endstopped diorganopolysiloxane polymer is as follows:

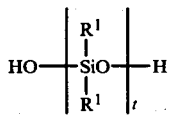

Where $R'$ is the same as previously given for the definition of the organo group and $t$ varies such that the polymer has generally a viscosity varying from 10 to 10,000 centipoise at 25° C. and more preferably has a viscosity varying from 50 to 5,000 centipoise at 25° C. A process for producing such a polymer is well known. Such a process generally comproses taking diorganodichlorosilanes and hydrolyzing them in water, then reducing the acidity to less than 25 parts per million by decanting the excess acid water phase and heating the resulting mixture to vent off acid. Finally, there is additionally added a base to neutralize the acid. The resulting silanol terminated low molecular weight diorganopolysiloxane polymer is then filtered to remove the salts and other impurities to yield the relatively pure low molecular silanol endstopped diorganopolysiloxane polymer. For higher molecular weight material, that is above 1,000 centipoise viscosity at 25° C., then what is done is to take the hydrolyzate that is obtained and then that is added to it small quantities of KOH and the hydrolysate is heated at elevated temperatures so as to preferentially distill overhead relatively pure octaorganocyclotetrasiloxanes. These cyclotetrasiloxanes are taken and mixed in the desired proportions to obtain the desired substitution in the end polymer. To this cyclotetrasiloxane there is added anywhere from 50 to 500 parts per million of KOH again and the desired amounts of water or as an alternative the desired quantities of the low molecular weight silanol diorganopolysiloxane polymer hydrolyzate. The amount of the low molecular weight hydrolyzate which was prepared by the hydrolysis of the diorganodichlorosilanes as a chainstopper will determine the final molecular weight of the silanol endstopped diorganopolysiloxane polymer that is formed. Accordingly, the hydrolyzate is added to the cyclotetrasiloxanes in the desired quantities and the mixture is heated at elevated temperatures, that is temperatures above 100° C. for periods of time varying from 1 to 8 hours to yield a silanol endstopped linear diorganopolysiloxane polymer having a viscosity of anywhere from 1,000 to 10,000 centipoise or more if desired. The KOH may then be neutralized with a mild acid such that the acid concentration in the polymer does not exceed 10 parts per million and then the excess cyclics can be stopped off to yield the silanol endstopped diorganopolysiloxane polymer. Further details and explanations with respect to the production of these polymers is to be found in the patent of M.D. Beers U.S. Pat. No. 3,838,205 which is incorporated into the present case by reference. As pointed out previously, it is preferred that there be utilized in the compositions of the instant case, the branch-chained silicone fluid since it is cheaper than the silanol endstopped linear diorganopolysiloxane polymer. Again with such linear silanol endstopped polymer, such a polymer can be preferably cured at a faster rate by the utilization of metal salt of carboxylic acid, such as tin salts or an iron salt. However, as pointed out previously such metal salts of carboxylic acids are undesired in the compositions of the instant case since they may cause back wetting of the silicone coating, that is make the silicone coating have an attraction to moisture. Such silicone materials may be applied by being dispersed in water and sprayed onto the silicate particulate matter to be coated. However, as mentioned previously, it is preferred that they be emulsified since silicones are not soluble in water.

Accordingly, it is desired that these materials be emulsified in water since they would be more easily sprayed on the silicate particulate matter to form a uniform coating.

Accordingly, per 40–60 parts by weight of branch-chained silicone fluid or of the linear diorganopolysiloxane polymer to be emulsified there is generally used from 0.5 to 5 parts by weight of an aliphatic carboxylic acid having 6–20 carbon atoms and from 0.1 to 0.8 parts by weight of ammonia with from 20–150 parts of water to form a stable silicone emulsion. The preferred aliphatic carboxylic acid is of course oleic acid. However, any other aliphatic carboxylic acid may be used. The preferred compound for the preferred anion forming the emulsification salt is ammonia because upon heating ammonia will evaporate from the emulsion into the atmosphere. It is desired to have ammonia as the anion in the emulsification salt in the silicone emulsions of the present case to prevent a phenomena known as back wetting. The emulsification salts which are formed with anions which are for instance alkali metal, such as sodium and potassium cause upon the curing of the silicone fluid and the evaporation of the water to leave behind an alkali metal salt on the silicone coating. Such salts will ionize in the presence of moisture, allowing the moisture to penetrate through the silicone coating which is formed about the silicate particulate matter. Accordingly, such back wetting is possible with standard alkali metal emulsification salts. It is desirable that such salts not be present on the surface of the silicone coating or mixed with the silicone coating. For this reason it is desirable that the anion in the emulsification salt be an anion emulsification salt of ammonia.

There only need be present sufficient ammonia so as to form a proper ammonia emulsification salt such that the silicone fluid can be properly emulsified to form a stable water emulsion. Then when the emulsion is applied to the silicate particulate matter, either by heating the silicate particulate matter or by having the silicate particulate matter preheated to a temperature of at least 150° C. or thereabouts, the ammonia will simple evaporate to the atmosphere leaving behind an aliphatic carboxylic acid which is an oil and which will add rather than detract from the water repellent properties of the silicone coating.

It should also be noted that while there has been specified in the claims and specification that there be used 40-60 parts by weight of the branch-chained silicone fluid or of the linear diorganopolysiloxane and from 0.5-5 parts of the aliphatic carboxylic acid and from 0.1-0.8 parts by weight of ammonia and 20-150 parts water to produce the silicone emulsion, there is nothing critical about any of these concentrations. The foregoing ingredients can be utilized and varied as desired to produce a stable emulsion. Thus, amounts of the ingredients may be utilized in the above concentrations and may be varied as desired. There need be present sufficient amounts of the emulsification salt to form the ammonia carboxylic acid salt so it will emulsify the silicone fluid or the linear diorganopolysiloxane in water. As can be appreciated the concentration of the ammonium salt plus the water plus the silicone fluid that will form a stable emulsion will vary by a great deal. It should be also noted that an aliphatic carboxylic acid may be used. However, other carboxylic acids may be utilized there are emulsifying agents for silicone fluids. It is only necessary that the carboxylic acid, whether it be aliphatic or aromatic of the nature of an oil in its pure form, such that it will be hydrophobic so that it will repel or add to the water repellency of the silicone coating rather than detract from it, that is rather than attract water to the silicone coating. Examples of carboxylic acid that may be utilized as an emulsifying agents in the instant invention are as follows:

| | |
|---|---|
| Elaidic Acid | Arotic Acid |
| Azelaic Acid | Gaidic Acid |
| Pelargonic Acid | Aleurtic Acid |
| Sebacic Acid | Muconic Acid |
| Caprylic Acid | Myristic Acid |
| Stearic Acid | Isobutyric Acid |
| Stearolic Acid | Valeric Acid |
| Copric Acid | Caproic Acid |
| Undecanoic Acid | Enanthic Acid |
| Lauric Acid | Lactaric Acid |
| Erucic Acid | Behenic Acid |
| Ricinoleic Acid | Agaric Acid |
| Aupanodonic Acid | Brassic Acid |
| Behenolic Acid | Margaric Acid |
| Melissic Acid | Enanthis Acid |

The most preferred carboxylic acid is oleic acid since it is found to perform satisfactorily in all respects. It should be noted that aromatic carboxylic acid may be utilized. It should be noted that in preparing the emulsion as will be explained below, it is preferred that there be utilized in the emulsion from 0.01 to 0.5 parts of a silicone antifoam compound. Usually such a silicone antifoam compound comprising basically a mixture or emulsion of a polydimethylsiloxane polymer having a viscosity of anywhere from 100 to 10,000 centipoise at 25° C. which is emulsified by itself or mixed with the usual emulsifying agents and mixing in filler such as for instance silazane treated fumed silica. Such a silicone fluid with the foregoing filler alone or with the foregoing filler in emulsion form when added in small quantities in the process of the preparation of an emulsion of the instant case will cut down the amount of foam that is formed during the process for forming the emulsion.

The amount of the emulsifying agent that is present in the relatively small quantity of antifoam compound, that is added to the emulsion does not detract from the water repellent properties of the silicone coating that is formed from the silicone emulsion of the instant case.

The process for forming the emulsion is as follows:

The branch-chained silicone fluid or the silanol endstopped diorganopolysiloxane polymer is pumped to a premixed tank. Then the aliphatic carboxylic acid which is clean is added to silicone fluid, then the silicone fluid and the aliphatic carboxylic acid are mixed by using rapid agitation for anywhere from 10-60 minutes. Preferably the mixing is carried out at the temperature of 25°-50° C. and more preferably from 25°-35° C. In a separate tank there is blended the ammonia and half the total amount of water in which they are blended or mixed for a period of time varying anywhere from 10 to 60 minutes and preferably varying from 20 to 40 minutes. Then slowly the ammonia water blend is added to the premixed tank containing the silicone fluid and aliphatic carboxylic acid and the mixture is stirred, and the addition taking place anywhere from 10 to 60 minutes with rapid agitation and preferably from 20 to 40 minutes.

Then to this concentration of ingredients there is added a small amount of antifoam to reduce or control the foaming of the emulsion, that is formed as it is being agitated. Then the second part of water or the rest of the water is then added to the blend and agitation is continued anywhere from 20-60 minutes and more preferably from 30-40 minutes. The emulsion will then be analyzed for water-content and if it passes the stability emulsion water content then the emulsion will be passed through a homogenizer at a pressure of above 500 psig and then passed into the necessary steel drums.

The foregoing emulsion is prepared as indicated above is not flammable with only traces of amount of hydrogen gas occasionally being liberated in storage. The emulsion for the linear silanol endstopped diorganopolysiloxane polymer is prepared in much the same way as was the emulsion for the branch-chained silicone fluid. It should be noted that in these emulsions there may be utilized by weight as stated previously by weight of the branch-chained silicone fluid or of the linear diorganopolysiloxane polymer as stated previously of 0.01 to 0.1% by weight of a metal salt of carboxylic acid as the catalyst for curing the silicone fluid or the linear diorganopolysiloxane polymer. However, as stated previously, such salts will remain on the silicone coatings after it has cured and are undesirable because they tend to allow moisture to penetrate the silicone coating rather than assist the silicone coating in repelling moisture. However, if a rapid cure is a very basic need in the application of the silicone coating and the silicone coating does not have to have maximum water resistance, then such salt may be utilized in small quantities to increase the rate of cure of the silicone coating.

The emulsion usually contains from anywhere from 30–60% by weight of silicone solids. When it is desired to utilize the emulsion to apply it to the silicate particulate matter, it is preferably diluted with water such that there is anywhere from 1–5% by weight of silicone solids and then the silicone emulsion is sprayed by normal spraying equipment onto the particulate silicate matter, as it comes from the expanding process, that is the expanded perlite leaves the heated furnace and before it has reached room temperature, has a temperature of at least 150° C. and more preferably at least 300° C. The silicone emulsion is sprayed on the heated particles. The heat in the heated particles then causes the water to evaporate almost instantly and cures the silicone fluid to result in the rapid formation of a silicone coating on the expanded perlite or vermiculite silicate particles, in the same drying and curing step, the ammonia is evaporated from the emulsion leaving behind the aliphatic carboxylic acid as an oil on the silicone coating.

However, while the above is the preferred process for applying the silicone emulsion to particulate silicate matter, it is only exemplary. Other processes may be utilized such as that for instance the silicone coating may be applied to the perlite and then the perlite may be heated at elevated temperatures above 100° C. to cure the silicone coating. It should be noted that elevated temperatures are preferred in the application of the silicone emulsion in accordance with the instant process since if elevated temperatures are not utilized and no curing catalyst is utilized, the branch-chained silicone fluid and the linear silanol endstopped diorganopolysiloxane will cure slowly over a prolonged period such as a matter of weeks. Accordingly, without the use of a metal salt of carboxylic acid as a curing catalyst, it is desirable and necessary for the silicone emulsion to be applied to the expanded perlite particles and such particles be heated, that is preheated or subsequently heated or simultaneously heated to elevated temperatures above 150° C. and more preferably above 300° C. so that the silicone fluid may cure in a short period of time to form a silicone coating.

The examples below are given for the purpose of illustrating the present invention. The Examples below are not given for any purpose of setting limits or bounds to the definition of the present invention as set forth in the specification and the claims.

The Examples below are illustrations of the present invention only. All parts in the examples are by weight.

EXAMPLE 1

There was prepared an emulsion comprising a silicone fluid having $(CH_3)_3SiO_{0.5}$ units, $(CH_3)_2SiO$ units and $CH_3SiO_{1.5}$ units with a viscosity of 50 centipoise at 25° C. An emulsion was formed from the fluid having 50% by weight of the silicone fluid, 1.40% by weight of oleic acid, 0.30% by weight ammonia, and the rest being water. One part of this emulsion was diluted with 20 parts of water. The diluted emulsion was sprayed on a dry bed of perlite and the perlite was heated at 300° F. for 10 minutes. The dried perlite which was composition A was tested for water absorbency.

One part of the 50% solid silicone emulsion previously described was diluted with 30 parts of water. The diluted emulsion was sprayed on a dry bed of perlite and the perlite was heated at 300° F. for 10 minutes. The dried perlite which was Composition B was tested for water absorbency.

One part of the 50% solids emulsion previously described was diluted with 40 parts of water. The diluted emulsion was sprayed on a dry of perlite and the perlite was heated at 300° F. for 10 minutes. The dried perlite which was Composition C, was tested for water absorbency. One part of the 50% solid emulsion previously described was diluted with 20 parts of water, the diluted emulsion was sprayed on a dry bed of perlite and the perlite was heated at 500° F. for 10 minutes so as to assure water evaporation. The dried perlite which was Composition D was tested for water absorbency.

Water Repellency Test

The water repellency of perlite insulation was determined in accordance with the following procedure. A rigid plastic tube 2 inch ID by 12 inches long with a 16 mesh plastic screen covering firmly fastened or adhered to the bottom opening was employed. The tube was marked at 7.77 inches from screen covered end indicating a volume of 400 ml. The plastic tube was filled with the perlite insulation to level slightly above the 400 ml. mark. It was then compacted by dropping the tube from a height of approximately 3 inches on a large rubber stopper for 10 drops. As the sample compacted to a level below the 400 ml. mark, additional material was added so that after the tenth drop the level of the sample was within ⅛ inch of the 400 ml. mark. The tube was kept in a vertical position during compaction. With the tube supported in a vertical position and a beaker positioned under the tube. There was poured 50 ml. of water onto the perlite insulation. There was allowed 3 minutes for the water to drain through specimen, then the the tube was tilted approximately 45° to drain water collected on screen. There was poured water which was collected in the beaker into graduate and the recorded amount, which was the amount of water which was repelled by the treated perlite loose fill insulation.

The results are listed below:

| Composition | % Water Repelled |
|---|---|
| A | 97 |
| B | 92 |
| C | 84 |
| D | 98 |

I claim:

1. A silicone emulsion for treating silicate particulate matter selected from perlite and vermiculite to make the particulate matter water-resistant comprising (a) from 40 to 60 parts by weight of a silicone fluid having $R_2SiO$ units. $R SiO_{1.5}$ units and $R SiO_{0.5}$ units where the ratio of organosiloxy units to diorganosiloxy units varies from 0.11 to 1.4 inclusive and the ratio of triorganosiloxy units to diorganosiloxy units varies from 0.02 to about 1 inclusive and the fluid has a silanol content varying from 0.1 to 8 percent by weight and a viscosity varying from 10 to 10,000 centipoise at 25° C. and where R is selected from the class consisting of alkyl radicals of 1 to 8 carbon atoms vinyl radicals and mononuclear aryl radicals; (b) from 0.5 to 5 parts by weight of an aliphatic carboxylic acid having from 6 to 20 carbon atoms; (c) from 0.1 to 0.8 parts by weight of ammonia and (d) from 20 to 150 parts of water.

2. The silicone emulsion of claim 1 wherein said aliphatic carboxylic acid is oleic acid.

3. The silicone emulsion of claim 1 wherein R is methyl.

4. The silicone emulsion of claim 1 wherein there is present from 0.1 to 0.5 parts by weight of a silicone antifoam compound.

5. The silicone emulsion of claim 4 wherein the antifoam compound is a dimethylpolysiloxane of a viscosity varying from 10 to 10,000 centipoise at 25° C. dispersed or emulsified in water.

6. A method for forming a silicone emulsion for treating silicate particulate matter selected from perlite and vermiculite to make the particulate matter water-resistant comprising (a) mixing from 40 to 60 parts by weight of a silicone fluid having $R_2SiO$ units, $R\ SiO_{1.5}$ units and $R_3SiO_{0.5}$ units where the ratio or organosiloxy units to diorganosiloxy units varies from 0.11 to 1.4 inclusive and the ratio of triorganosiloxy to diorganosiloxy units varies from 0.02 to 1, inclusive, and the fluid has a silanol content varying from 0.1 to 8 percent by weight and a viscosity varying from 10 to 10,000 centipoise at 25° C., where R is selected from the class consisting of alkyl radicals of 1 to 8 carbon atoms, vinyl radicals, and mononuclear aryl radicals and from 0.5 to 5 parts of an aliphatic carboxylic acid having from 6 to 20 carbon atoms; (b) mixing separately from 20 to 150 parts of water with from 0.1 to 0.8 parts of ammonia; (c) adding with agitation the ammonia-water mixture to the silicone fluid, carboxylic acid mixture; and (d) adding additional water as needed.

7. The method of claim 6 wherein the process is carried out at a temperature in the range of 25° C. to 50° C.

8. The method of claim 6 wherein approximately half of the water is added in step (b) and the rest of the water is added in step (d).

9. The method of claim 6 wherein said aliphatic carboxylic acid is oleic acid.

10. The method of claim 6 wherein R is methyl.

11. The method of claim 6 wherein there is present from 0.01 to 0.5 parts by weight of a silicone antifoam compound.

12. The method of claim 11 wherein the antifoam compound is a dimethylpolysiloxane of a viscosity varying from 10 to 10,000 centipoise at 25° C. dispersed or emulsified in water.

13. A silicone coated particulate matter comprising 1) a silicate particulate matter selected from perlite and vermiculite which is coated with (2) the cured composition of the following mixture of ingredients (a) from 40 to 60 parts by weight of a silicone fluid having $R_2SiO$ units, $R\ SiO_{1.5}$ units and $R_3SiO_{0.5}$ units where the ratio of organosiloxy units to diorganosiloxy units varies from 0.11 to 1.4 inclusive, the ratio of triorganosiloxy units to diorganosiloxy units varies from 0.02 to about 1, inclusive, and the fluid has a silanol content varying from 0.1 to 8 percent by weight and a viscosity varying from 10 to 10,000 centipoise at 25° C. and where R is selected from the class consisting of alkyl radicals of 1 to 8 carbon atoms, vinyl radicals and mononuclear aryl radicals and (b) from 0.5 to 5 parts by weight of an aliphatic carboxylic acid having from 6 to 20 carbon atoms.

14. The silicone coated matter of claim 13 wherein said aliphatic carboxylic acid is oleic acid.

15. The silicone coated matter of claim 13 wherein R is methyl.

16. A method for coating silicate matter selected from perlite and vermiculite so as to render it water-resistant comprising (1) applying to the surface of the silicate particulate matter a silicone emulsion having (a) from 40 to 60 parts by weight of a silicone fluid having $R_2SiO$ units, $R\ SiO_{1.5}$ units and $R_3SiO_{0.5}$ units where the ratio of organosiloxy units to diorganosiloxy units varies from 0.11 to 1.4, inclusive, and the ratio of triorganosiloxy units to diorganosiloxy units varies from 0.02 to about 1, inclusive, and the fluid has a silanol content varying from 0.1 to 8 percent by weight and a viscosity varying from 10 to 10,000 centipoise at 25° C. and where R is selected from the class consisting of alkyl radicals of 1 to 8 carbon atoms, vinyl radicals, and mononuclear aryl radicals; (b) from 0.5 to 5 parts by weight of an aliphatic carboxylic acid having from 6 to 20 carbon atoms; (c) from 0.1 to 0.8 parts by weight of ammonia; and (d) from 20 to 150 parts of water; and (2) curing the silicone emulsion and evaporating the water.

17. The method of claim 16 wherein step (2) is accomplished by preheating the silicate particulate matter to at least 150° C.

18. The method of claim 16 wherein said aliphatic carboxylic acid is oleic acid.

19. The method of claim 16 wherein R is methyl.

20. The method of claim 16 wherein in the silicone emulsion there is present from 0.01 to 0.5 parts by weight of a silicone antifoam compound.

21. A method for coating silicate particulate matter selected from perlite and vermiculite so as to render it water-resistant comprising (1) applying to the surface of the silicate particulate matter a silicone emulsion having (a) from 40 to 60 parts by weight of a linear silanol terminated diorganopolysiloxane polymer having a viscosity varying from 10 to 10,000 centipoise at 25° C. where the organo group is selected from the class consisting of alkyl radicals of 1 to 8 carbon atoms and mononuclear aryl radicals; (b) from 0.5 to 5 parts by weight of an aliphatic carboxylic acid having from 6 to 20 carbon atoms; (c) from 0.1 to 0.8 parts by weight of ammonia; and (d) from 20 to 150 parts of water; and (2) curing the silicone emulsion and evaporating the water.

* * * * *